(12) United States Patent
Wingen

(10) Patent No.: US 6,820,145 B2
(45) Date of Patent: Nov. 16, 2004

(54) CIRCUIT ARRANGEMENT AND METHOD FOR IMPROVING DATA MANAGEMENT IN A DATA COMMUNICATIONS CIRCUIT

(75) Inventor: Neal T. Wingen, Algonquin, IL (US)

(73) Assignee: Koninklijke Philips Electronics N.V., Eindhoven (NL)

(*) Notice: Subject to any disclaimer, the term of this patent is extended or adjusted under 35 U.S.C. 154(b) by 280 days.

(21) Appl. No.: 09/871,027

(22) Filed: May 31, 2001

(65) Prior Publication Data

US 2002/0184413 A1 Dec. 5, 2002

(51) Int. Cl.[7] .................................................. G06F 13/14
(52) U.S. Cl. .................... 710/52; 711/118; 370/416; 375/377
(58) Field of Search .......................... 710/52; 711/118; 370/416; 375/377

(56) References Cited

U.S. PATENT DOCUMENTS 5,619,544 A * 4/1997 Lewis et al. ................ 375/377
5,949,787 A    9/1999 Wegner et al.
6,226,698 B1 * 5/2001 Yeung et al. ................. 710/57
6,279,077 B1 * 8/2001 Nasserbakht et al. ....... 711/118
6,442,172 B1 * 8/2002 Wallner et al. ............. 370/416

FOREIGN PATENT DOCUMENTS

EP          0 632 391           1/1995

* cited by examiner

Primary Examiner—A. Elamin
(74) Attorney, Agent, or Firm—Peter Zawilski

(57) ABSTRACT

A circuit arrangement improves CPU efficiency by processing data through a FIFO circuit of a UART chip using a CPU adapted to detect, and respond with various options to, the current storage capacity of the FIFO circuit. In one example embodiment, a circuit arrangement includes a universal asynchronous receiver/transmitter (UART) chip having a FIFO circuit and an arithmetic logic unit (ALU) adapted to generate an N-bit variable binary signal, wherein the binary signal varies as a function of a current storage capacity of the FIFO circuit. The circuit arrangement further includes a control circuit communicatively coupled with the UART chip that is adapted to read the N-bit variable binary signal and, in response, to control the data flow through the FIFO circuit.

20 Claims, 2 Drawing Sheets

CIRCUIT ARRANGEMENT AND METHOD FOR IMPROVING DATA MANAGEMENT IN A DATA COMMUNICATIONS CIRCUIT

FIELD OF THE INVENTION

The present device relates generally to data communications circuits and, in particular, to a universal asynchronous receiver/transmitter (UART) with improved data handling functionality for use with a various CPUs and peripherals.

BACKGROUND OF THE INVENTION

Most digital circuits process data in parallel to provide more efficient processing. Many digital devices also use a serial port for bringing data to and from the device from a remote site, often coupled to a relay station via a telephone or LAN line. The universal asynchronous receiver/transmitter (UART) is such a digital device that performs parallel-to-serial conversion of digital data. A UART communicates between parallel and serial forms by converting received data between parallel I/O devices, such as a local CPU, and serial I/O devices, such as POTS modems, Ethernet devices and other communications devices. Most traditional UART devices can be programmed to operate at a selected baud rate, and newer generation UARTs handle communications more efficiently as technology advances, to a great extent due to larger FIFO depths and improved flow control (e.g., fewer retries required and waits for the internal FIFO to fill or empty).

UART devices typically operate in one of two software modes: either in a polled mode or in an interrupt mode. In the polled mode, software periodically monitors internal registers to determine if a read or a write action is necessary. In the interrupt mode, software waits for an interrupt event to trigger a read or a write to a particular register. Most of the software monitoring functions used in these applications involve receive and transmit FIFOs that contain serial communications port data. A trigger level for respective FIFOs is usually defined that indicates to the software that it is time to receive or transmit data. Unfortunately, latency time between reaching the trigger level and using the software to prompt the CPU to read or transmit the data in the FIFOs can be sufficiently high so as to lose data in the process.

SUMMARY OF THE INVENTION

Various aspects of the present invention are directed to facilitating efforts to improve CPU efficiency in controlling data flow through a FIFO circuit of a UART chip. The present invention is exemplified in a number of implementations and applications, some of which are summarized below.

According to an example embodiment of the present invention, a circuit arrangement includes a universal asynchronous receiver/transmitter (UART) chip having a FIFO circuit and an arithmetic logic unit (ALU) adapted to generate an N-bit variable binary signal, wherein the binary signal varies as a function of a current storage capacity of the FIFO circuit. The circuit arrangement further includes a control circuit communicatively coupled with the UART chip that is adapted to read the N-bit variable binary signal and, in response, is adapted to control the data flow through the FIFO circuit.

More particular implementations of the present invention entail using the CPU to control the data flow through a FIFO circuit, in response to varying levels of storage capacity in the FIFO circuit, by determining when to control the data flow through the FIFO circuit or determining immediately whether or not to control the data flow through the FIFO circuit. In another example implementation, the CPU adjusts a previously programmed parameter used to prompt a subsequent polling of the UART chip in response to the FIFO circuit storage capacity level.

The above summary is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
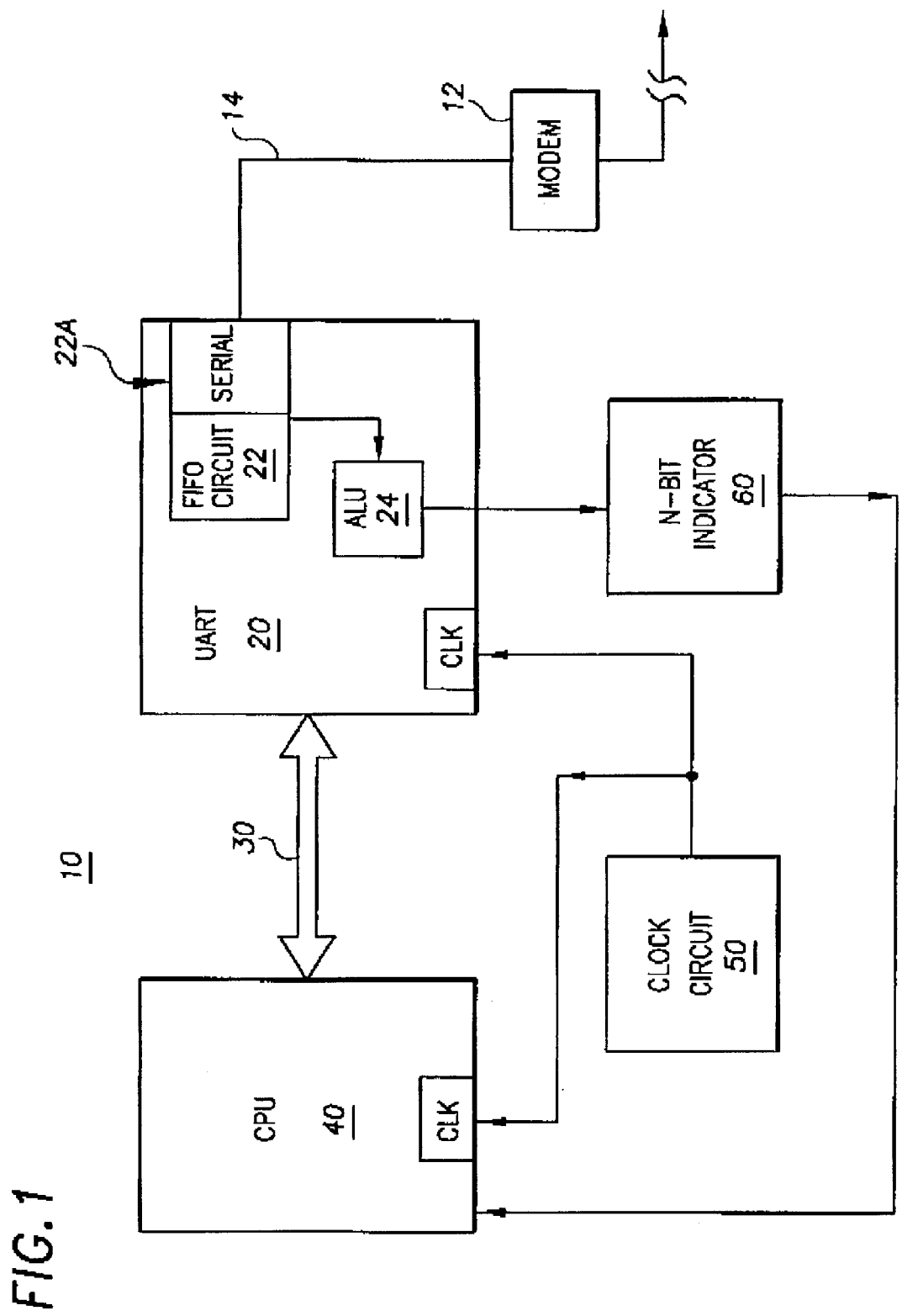
FIG. 1 is a block diagram of an arrangement of integrated circuit devices that includes a universal asynchronous receiver/transmitter (UART) chip, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is generally directed to improving CPU efficiency in processing data through a FIFO circuit of a UART chip using a CPU arrangement adapted to detect the current storage capacity of the FIFO circuit and to respond to the detected current storage capacity with various options. In one example embodiment of the present invention, the CPU determines in real time the exact number of bytes to read from or write to the FIFO circuit. Various embodiments of the present invention are particularly useful in applications benefiting from the elimination of CPU monitoring of receive and transmit status bits during the reading and writing of the FIFO registers. While the present invention is not limited to such devices, an appreciation of various aspects of the invention is best gained through a discussion of various examples using this application.

According to an example embodiment of the present invention, a circuit arrangement includes a universal asynchronous receiver/transmitter (UART) chip that has a FIFO circuit and a monitoring circuit that monitors the current storage capacity of the FIFO circuit. The circuit arrangement also includes a control circuit that processes current storage capacity information of the FIFO circuit and, in response to the current storage capacity information, controls the data flow through the FIFO circuit. In one particular example, the monitoring circuit includes an arithmetic logic unit (ALU) that generates an N-bit variable binary signal that indicates the number of empty or full register locations of transmit/receive FIFO registers of the FIFO circuit. The control circuit includes a CPU that polls the UART chip and reads the binary signal, and the binary signal is used as an indication of the storage capacity of the transmit/receive FIFOs of the FIFO circuit.

In another particular example embodiment, the circuit arrangement includes a receive and/or transmit FIFO that has a special threshold (or trigger) level indicator. In response to the FIFO being filled to a point that is M bytes in range of (short of or over) the threshold level, an ALU within the chip generates an N-bit signal indicating the exact number of FIFO locations short of or over the threshold level. It will be appreciated that the N-bit signal can be implemented to represent a positive or negative binary number to indicate a full/empty quantity relative to a level at some mid-level of the FIFO, or can be implemented to represent a binary number to indicate a full/empty quantity relative to a FIFO-completely-full, FIFO-overflow or FIFO-empty condition.

In one such implementation involving use of a mid-level FIFO indicator, a 64-byte-deep receive FIFO has a threshold (or trigger) level of 16-bytes full, and has an N-bit special threshold level indicator, where N equals four to indicate to the CPU when the receive FIFO is filled to within 8 bytes of the 16-byte threshold. Thus, if the CPU were to poll the FIFO when it stores 9 bytes, the four-bit special threshold level indicator will read "0111" to represent seven (16-9). At this instance in response to the CPU recognizing that the receive FIFO will soon reach the threshold level, the CPU can read immediately off-load the FIFO by reading some or all of the 9 bytes or, if there is another impending task that can be quickly performed, the CPU can perform the task and then immediately return to the task of reading some or all of the bytes in the FIFO well before the FIFO fills or overflows. Since the CPU is continuously receiving information on the storage capacity of the FIFO circuit, the CPU can be programmed to more judiciously perform its tasks while actively monitoring the and controlling the data flowing through the FIFO circuit.

Referring now to the figures, FIG. 1 is a block diagram of an arrangement 10 of integrated circuit devices that includes a UART chip that is configured according to an example embodiment of the present invention. In this example embodiment, arrangement 10 is configured to process serial data 14 that is received from or is transmitted to a modem 12. Serial data 14 passes through a FIFO circuit 22 of a UART chip 20 at a selected clock rate. Arrangement 10 further includes a CPU 40 having a memory management unit (not shown) that provides the address, data and control signals for communicating with UART chip 20 via a parallel data bus 30. CPU 40 and UART chip 20 are both responsive to a clock signal from a clock circuit 50.

In this example, FIFO circuit 22 includes a serial communications circuit 22A that communicates incoming serial data and includes a parallel-data output circuit (not shown) that communicates parallel data coming from CPU 40. UART chip 20 further includes an ALU 24 that generates an N-bit variable binary signal that varies as a function of the current storage capacity of FIFO circuit 22. An N-bit indicator circuit 60 receives the binary signal from ALU 24 and transmits a storage status condition of FIFO circuit 22 to CPU 40. The storage status conditions that CPU 40 responds to include: exact number of empty/full transmit register locations in the FIFO circuit, exact number of empty/full receive register locations in the FIFO circuit, exact number of transmit/receive register locations relative to a threshold indicator (not shown) provided by FIFO circuit 22 or whether the number of empty/full locations in the FIFO circuit has crossed a threshold level.

CPU 40 generally controls the data flowing through FIFO circuit 22 as a function of any of the status conditions indicated by N-bit indicator circuit 60. In one example embodiment, CPU 40 reads the exact number of bytes contained in the receive FIFO of FIFO circuit 22 even though the number of bytes has increased after reaching the programmed trigger level. With the present invention, the CPU of a system with high CPU latency that receives or transmits additional serial bytes after reaching the trigger event is now programmable to review indicator circuit 60 to determine whether the additional serial bytes can be read or transmitted.

In another example embodiment, CPU 40 polls UART chip 20 such that ALU 24 generates a binary signal that CPU 40 reads and, in response: determines when to control the data flow through FIFO circuit 22; determines whether or not to control the data flow through the FIFO circuit immediately; or adjusts a previously programmed parameter used to prompt a subsequent polling of the UART chip.

Yet another example embodiment is also directed to CPU latency issues. Conventionally, a UART can generate an interrupt when a predetermined trigger level, N, is reached in the receive FIFO. If the interrupt handler routine latency is large (the time it takes to get the CPU to service the interrupt), several more characters, M, can be received by the FIFO. The UART FIFO is adapted to permit the CPU to read not just the N bytes, as is conventional, but to allow the CPU to read N+M characters as the FIFO level is "real-time" and available to the CPU. This functionality can also be implemented using conventional hardware state machine logic.

Figure 2:
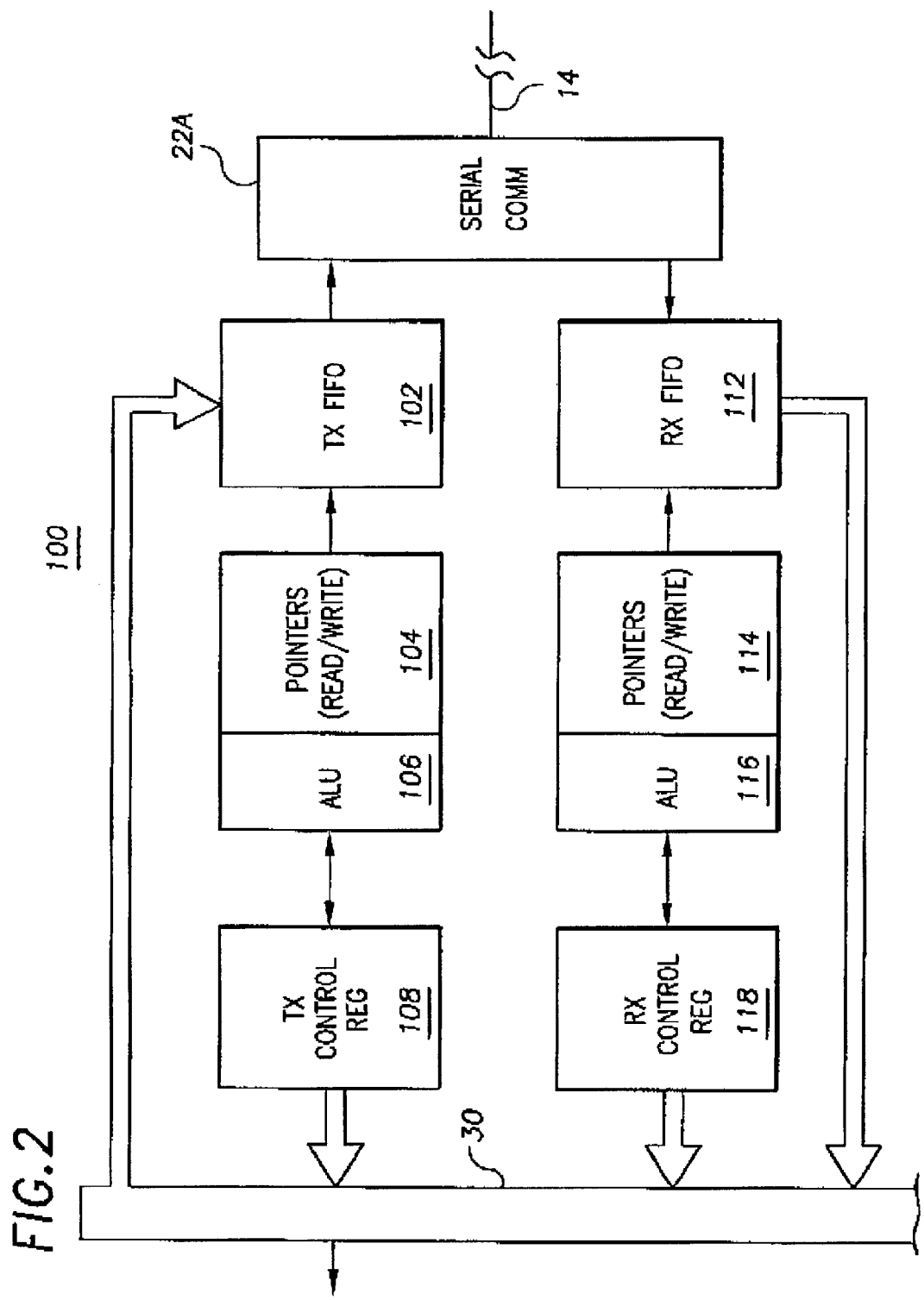
FIG. 2 is a diagram of one of the circuit blocks of FIG. 1 according to another example embodiment of the present invention.

Referring now to FIG. 2, a circuit arrangement 100 illustrates an expanded implementation of UART chip 20 as per FIG. 1, according to an example embodiment of the present invention. In this example embodiment, arrangement 100 includes a transmit FIFO 102 and a receive FIFO 112 that process data through serial communications circuit 22A. FIFO 102 and FIFO 112 provide the current storage capacity of FIFO circuit 22 to CPU 40 by performing arithmetic operations on a set of read and write pointers 104 and 114. Arithmetic logic units 106 and 116, respectively, generate an N-bit variable binary signal as a function of the location of read and write pointers 104 and 114. In this example embodiment, CPU 40 receives the current storage capacity of FIFO circuit 22 from ALUs 106 and 116 via parallel bus 30 from a transmit control register 108 and a receive control register 118. As the storage capacity levels of FIFO 102 and FIFO 112 change, CPU 40 receives an indication of the changes from control registers 108 and 118. As previously discussed, CPU 40 has various options for controlling data flow through FIFO circuit 22 depending on the detected storage level of FIFO circuit 22 (e.g., depending upon the amount of storage capacity in control registers 108 and 118).

In another example embodiment, CPU 40 detects the storage capacity of FIFO 102 upon receiving the N-bit variable binary signal from ALU 106 via control register 108. In this example, transmit FIFO 102 is 64 bytes deep and the threshold level is 32 bytes. In response to the current storage capacity of FIFO 102, ALU 106 generates a positive number when the threshold level is exceeded, a negative number when the storage capacity is under the threshold level, and zero when the storage level is at threshold level, each of which indicates a storage status condition of FIFO 102. In this example, when FIFO 102 is at 38 bytes, the threshold has been exceeded by 6 bytes (i.e., 0110) and CPU 40 responds with writing 38 bytes to FIFO 102. In a related example, when FIFO 102 is at 31 bytes, the level is under the threshold (i.e., −1) and CPU 40 responds with writing 31 bytes to FIFO 102. In a related example embodiment, CPU 40 responds by waiting until FIFO 102 reaches the trigger level before writing to FIFO 102.

Any of the above embodiments can be implemented by modifying commercially-available UART devices to include the above-described operation. For further details on such commercially-available components and their modes of operation, reference may be made to Product Specifications, No. 853-1585-23061 (Jan. 31, 2000) and No. 853-1078-19971 (Sep. 4, 1998, for UART part numbers SCC2691AC1A28 and SC26C92A1A UART part numbers; each being commercially available from Philips Semiconductor and the respective specifications and related data being incorporated herein by reference. In various example embodiments, the above-described UART arrangements are formed in a single integrated chip, and arranged using discrete components.

Accordingly, the present invention achieves improved CPU efficiency in processing data through a FIFO circuit of a UART chip by controlling the data flow through the FIFO circuit in response to receiving current storage capacity levels of the transmit and receive FIFO registers. While the present invention has been described with reference to several particular example embodiments, those skilled in the art will recognize that many changes may be made thereto without departing from the spirit and scope of the present invention, which is set forth in the following claims.

What is claimed is:

1. A circuit arrangement, comprising:
    a universal asynchronous receiver/transmitter (UART) chip including a FIFO circuit and an arithmetic logic unit (ALU) adapted to generate an N-bit variable binary signal, the binary signal varying as a function of a current storage capacity of the FIFO circuit; and
    a control circuit communicatively coupled with the UART chip, adapted to read the N-bit variable binary signal and, in response, to control the data flow through the FIFO circuit.

2. The circuit arrangement of claim 1, wherein the FIFO circuit includes a serial communication circuit adapted to communicate serial data with the FIFO circuit, and a parallel-data output circuit adapted to communicate parallel data with the FIFO circuit.

3. The circuit arrangement of claim 1, wherein the control circuit includes a CPU.

4. The circuit arrangement of claim 3, wherein the CPU is programmed to poll the UART chip to read the N-bit variable binary signal and, in response, to determine when to control the data flow through the FIFO circuit.

5. The circuit arrangement of claim 3, wherein the CPU is programmed to poll the UART to read the N-bit variable binary signal and, in response, to determine whether or not to control the data flow through the FIFO circuit immediately.

6. The circuit arrangement of claim 3, wherein the CPU is programmed to poll the UART to read the N-bit variable binary signal and, in response, to adjust a previously programmed parameter used to prompt a subsequent poll of the UART chip.

7. The circuit arrangement of claim 1, wherein the N-bit variable binary signal is indicative of an exact number of empty register locations in the FIFO circuit.

8. The circuit arrangement of claim 1, wherein the N-bit variable binary signal is indicative of an exact number of full register locations in the FIFO circuit.

9. The circuit arrangement of claim 1, wherein the N-bit variable binary signal is indicative of an exact number of register locations relative to a threshold indicator provided by the FIFO circuit.

10. The circuit arrangement of claim 9, wherein the threshold indicator provided by the FIFO circuit indicates whether the number of full locations in the FIFO circuit has crossed a threshold level.

11. The circuit arrangement of claim 9, wherein the threshold indicator provided by the FIFO circuit indicates whether the number of empty locations in the FIFO circuit has crossed a threshold level.

12. The integrated circuit device of claim 1, wherein the universal asynchronous receiver/transmitter includes an extendible FIFO having one of a plurality of sizes selectable by the mode-selecting data.

13. The integrated circuit device of claim 1, wherein the universal asynchronous receiver/transmitter includes a flow-control circuit adapted to be enabled by the mode-selecting data.

14. The integrated circuit device of claim 1, wherein the universal asynchronous receiver/transmitter includes an extendible FIFO having one of a plurality of sizes selectable by the mode-selecting data, and wherein the universal asynchronous receiver/transmitter includes a flow-control circuit adapted to be enabled by the mode-selecting data and to indicate at least one flow-status condition of the FIFO.

15. A circuit arrangement, comprising:
    a universal asynchronous receiver/transmitter (UART) chip including a FIFO circuit and arithmetic logic means for generating an N-bit variable binary signal, the binary signal varying as a function of a current storage capacity of the FIFO circuit; and
    means, communicatively coupled with the UART chip for reading the N-bit variable binary signal and, in response, controlling the data flow through the FIFO circuit.

16. For use in a circuit arrangement including a CPU and a universal asynchronous receiver/transmitter (UART) chip that has a FIFO circuit, a method for passing data through the FIFO circuit, comprising:
    within the UART chip, arithmetically, generating an N-bit variable binary signal, the binary signal varying as a function of a current storage capacity of the FIFO circuit; and
    using the CPU communicatively coupled with the UART chip, reading the N-bit variable binary signal and, in response, controlling the data flow through the FIFO circuit.

17. The method of claim 16, wherein N is not less than 2.

18. The method of claim 16, wherein the binary signal varies relative to a threshold storage level of the FIFO circuit.

19. The method of claim 16, wherein the N-bit variable binary signal identifies a number in a range relative to a threshold storage level of the FIFO circuit, where the range is one of: above the threshold storage level, and below the threshold storage level.

20. The method of claim 16, wherein the N-bit variable binary signal identifies a number in a range relative to a threshold storage level of the FIFO circuit, where the range traverses the threshold storage level.

* * * * *